Aug. 25, 1931.                A. B. HARGIS                1,820,138
                         AUTOMATIC DRAIN VALVE
                         Filed March 31, 1930

A. B. Hargis,
INVENTOR

BY Victor J. Evans
ATTORNEY

Patented Aug. 25, 1931

1,820,138

UNITED STATES PATENT OFFICE

ANDREW B. HARGIS, OF JELLICO, TENNESSEE

AUTOMATIC DRAIN VALVE

Application filed March 31, 1930. Serial No. 440,538.

My present invention has reference to a means for draining fire hydrants, yard hydrants, water pipes, tanks and the like to prevent water above a predetermined level freezing therein in cold weather and causing the bursting or non-use thereof and which also may be employed for draining condensations from steam whistles, and in connection with other fluid conducting devices or containers.

My object is the provision of a valve for this purpose which shall be of a simple construction, easily attached to the fluid or pipe casing, and which is automatic and positive in operation.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 4 is a detail side elevation, with parts in section to illustrate the location of the improvement with respect to the lower or ground valve of a hydrant or the like.

Figure 1:
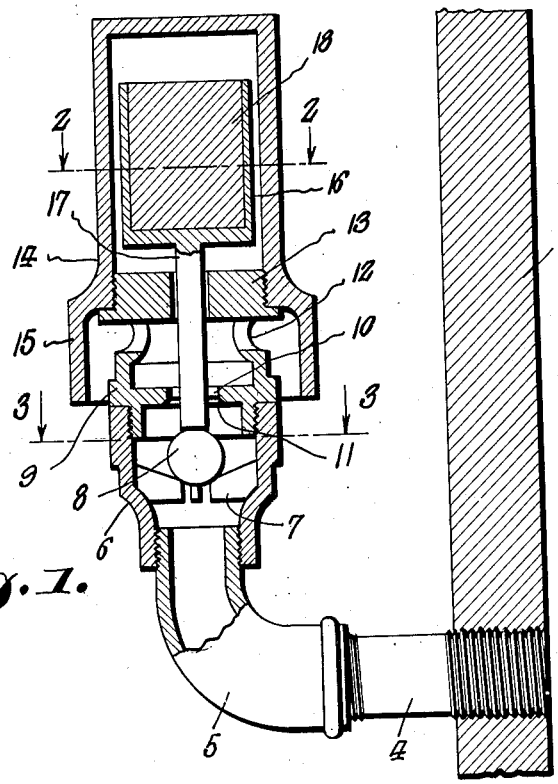
Figure 1 is a vertical longitudinal sectional view through the improvement.
Figure 4:
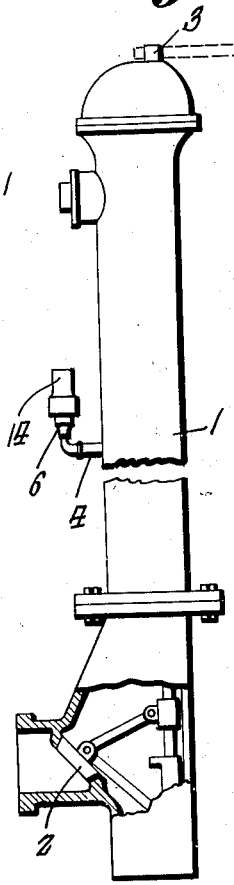
Figure 2:
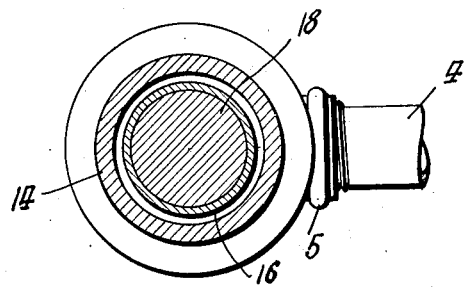
Figure 2 is a horizontal sectional view on the line 2—2 of Figure 1.
Figure 3:
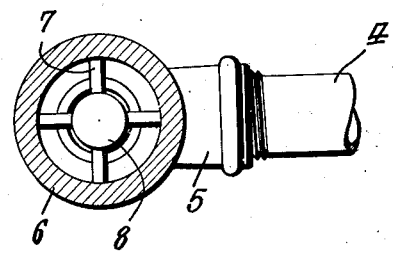
Figure 3 is a similar sectional view approximately on the line 3—3 of Figure 1.

For the purpose of this specification I will refer to my improvement in connection with a fire hydrant, as I have so illustrated the same in Figures 1 and 4 of the drawings, but it is to be understood that the improvement may be successfully employed as an attachment for any fluid conduit or conductor or a fluid tank or like receptacle which is to be drained when the fluid is not flowing therethrough or when the fluid passes beyond a predetermined desired level.

In the drawings the numeral 1 designates a conventional form of fire plug, that has a normally closed valve 2 controlling the passage therethrough, the valve being unseated by the operation of the usual detachable handle 3. The valve 2 is located below the frost line and my improvement is attached to the wall of the casing 1 above the seat for the valve 2, the same being positioned below the ground surface.

In the wall of the hydrant 1 I secure a short pipe and screw on the end thereof an elbow 5 that is upwardly directed and which has screwed on its outer end the lower section 6 of the body for the valve of the improvement. The section 6 is formed with alining inwardly directed fins 7 that afford an open support for a valve 8. In the showing of the drawings the valve is in the nature of a sphere but obviously valves of other types may be employed.

The upper section of the valve body is indicated by the numeral 9 and is screwed to the top of the lower section 6 and the section 9 has a lower horizontal partition wall provided with a central opening 10 that has a concaved or reamed surfacing element on its outer face that surrounds the opening and provides a seat 11 for the valve 8. Above the valve seat the body section 9 is provided with any desired number of alining fluid outlet openings 12 disposed below the threaded head 13 of the said valve body section 9.

Screwed on the head 13 there is the lower end of a cylinder 14. The outer end of the cylinder is closed and the said cylinder, from its interiorly threaded portion is outwardly enlarged and from thence extended downwardly to provide the same with what I will term a skirt 15 and the said skirt surrounds the fluid outlet openings 12 and the top or the upper portions of the valve body.

In the showing of the drawings I have arranged for slidable movement in the cylindrical chamber 14 the hollow top or head portion 16 of a plunger stem 17 that passes through a central opening in the top 13 of the valve body and through the opening 10 and which contacts with the valve 8 to force the same upon the fins or support 7. The hollow head 16 of the plunger receives therein a weight 18 which may be of lead or the like.

The valve is connected, as shown, to the wall or standpipe of the hydrant, and in Figure 1 of the drawings the valve is in normal position, that is, the same is open for draining the hydrant above the valve 2. The valve 8 is at all times in open position except when the main hydrant valve 2 is opened. When the hydrant valve 2 is open for use some of the water will first flow through the drain valve and waste through the ports or openings 12 but the increasing velocity or rush of water through the drain valve overcomes the combined weight or pressure on the valve 8 so that the said valve will rise by the force of velocity of water pressure thereagainst to cause the same to occupy its seat 11, thus closing the drain valve. The internal water pressure against the valve 8 holds the same seated as long as the hydrant is in use or the hydrant valve is open. When the hydrant valve 2 is closed again and the main pressure is relieved from the hydrant standpipe the small static water pressure due only to the full hydrant standpipe is immediately overcome by the greater combined weight of the valve 8 and the plunger and, therefore, the valve will immediately drop down onto the fins or its open rest support and thus allows the water in the hydrant standpipe to escape through the openings 12 in the valve body so that the water from the hydrant standpipe will thus find an outlet and such water will be directed into the ground below the valve body of the improvement, and thereby the liability of freezing of the water in the hydrant above the ground and above the drain valve level is effectively overcome.

A feature of the operation of the improvement is that an ordinary leak of the main hydrant valve will not cause sufficient velocity pressure of water to close the valve 8 and such leaking water will escape through the openings 12 and thus prevent the hydrant standpipe from filling up and consequently freezing.

The valve 8 and the plunger are not necessarily in the nature of separate elements as disclosed as the same may be integrally formed. The plunger head 16 is of such length that the same will not contact with either the top or the bottom of the chamber 14 when the valve is opened and closed. In lieu of the weight the plunger may be influenced by a spring and the improvement is, of course, constructed in different sizes to correspond in accordance with the size or height of the fluid conducting pipe, body or tank to which it is attached. The lead filler 18 for the plunger head 16 also varies to properly regulate the weight of the plunger and the valve 8 and clogging of the drain pipe is prevented by initial wasting of small quantity of water each time the main hydrant valve is opened. All of the parts of the improvement are of non-corrosive metal or like material.

In all cases where the drain valve is used to prevent freezing of fluid in hydrants, pipes and the like, the drain valve is installed on said conductor at a point below the frost line or where fluid in drain valve will not freeze.

Having described the invention, I claim:

1. A fluid draining device to be connected to a fluid conducting pipe, tank or the like, comprising a valve, an open rest for the valve, a seat for the valve above the rest and plunger means urging the valve on the open rest and a pipe connection between the valve and the fluid conducting pipe or tank.

2. A means for draining the fluid from a pipe or tank when such fluid passes beyond a predetermined level and when such pipe or tank is controlled by a valve for preventing the passage of fluid therethrough or thereinto, comprising a vertically arranged two-part body, whose lower part has a pipe connection with the pipe or tank and which lower part has inwardly directed fins therein, a valve to rest on such fins, the top part of the body being screwed to the lower part thereof and providing an open seat for the valve and outlet openings above the seat, a plunger guided through the upper part of the valve body and through the valve seat, and urging the valve onto the fins.

3. A means for draining the fluid from a pipe or tank when such fluid passes beyond a predetermined level and when such pipe or tank is controlled by a valve for preventing the passage of fluid therethrough or thereinto, comprising a vertically arranged two-part body, whose lower part has a pipe connection with the pipe or tank and which lower part has inwardly directed fins therein, a valve to rest on such fins, the top part of the body being screwed to the lower part thereof and providing an open seat for the valve and outlet openings above the seat, a head on the upper portion of the valve body above the openings, a chamber removably fixed on the head and having a depending skirt to surround the openings in the body, a hollow plunger head in the chamber, a stem thereon passing through the top of the body and through the valve seat and engaging the valve to urge the same against the fins, and a weight in the hollow head of the plunger.

In testimony whereof I affix my signature.

ANDREW B. HARGIS.